United States Patent [19]

Liou

[11] Patent Number: 5,734,157
[45] Date of Patent: Mar. 31, 1998

[54] BAR-CODE OPTICAL SCANNER

[76] Inventor: Kenneth Liou, 9F, 108-3 Min-Chuan Rd., Hsin-Tien, Taipei Hsien, Taiwan

[21] Appl. No.: 703,570

[22] Filed: Aug. 27, 1996

[51] Int. Cl.⁶ .................................................. B29D 13/18
[52] U.S. Cl. ........................... 250/216; 250/566; 235/472
[58] Field of Search ................................ 250/216, 566; 235/472

[56] References Cited

U.S. PATENT DOCUMENTS 4,786,798  11/1988  Lowsdach ............................... 250/216

*Primary Examiner*—Harold Pitts
*Attorney, Agent, or Firm*—Beveridge, DeGrandi, Weilacher & Young, LLP

[57] ABSTRACT

A bar-code optical scanner in which a converging prism is disposed in front of the light source to concentrate emitted light into a light beam, permitting it to be projected onto the bar code; the lens which is disposed between the reflector and the photosensor has a rectangular through hole forming a diaphragm, the long side of the through hole being disposed in parallel to the transversely disposed charge coupled device of the photosensor, the diameter of the through hole gradually reducing from the side of the photosensor toward the side of the reflector to match with the light path of reflected light passing therethrough; a converging meniscus lens is disposed in front of the photosensor to concentrate reflected light from the lens into the charge coupled device of the photosensor.

1 Claim, 3 Drawing Sheets

BAR-CODE OPTICAL SCANNER

BACKGROUND OF THE INVENTION

The present invention relates to bar-code optical scanners, and relates more particularly to such a bar-code optical scanner which permits the depth of bar-code recognizing field to be increased without affecting the scanning result.

Regular CCD type bar-code optical scanners commonly comprise a LED light source which projects light onto the bar code to be read, a CCD (charge coupled device) which picks up light reflected from the bar code, and a processing circuit formed of a CCD drive and amplifier circuit, an A/D waveform sampler comparator circuit, a decoder, etc. which processes photo signal obtained from the CCD into corresponding digital signal and then converts it into recognizable character data. This recognition procedure is to convert photo signal into recognizable character data. The intensity of photo signal has great concern with the quality of the recognition procedure. The intensity of photo signal is determined subject to (1) the intensity of the light of the LED light source, and (2) the reflecting rate of light from the bar code. If the distance of the light source is far from the bar code, the diffusion rate of the light from the light source will be relatively increased, thereby causing the reflecting rate of the bar code to be relatively reduced. Further, when reflected light from the bar code passes through the circular hole of the lens (the diaphragm), it is then picked up by the CCD. The size of the circular hole of the lens cannot be made too small, or the amount of incident light will be insufficient, causing the CCD unable to pick up the image. However, if the size of the circular hole of the lens is increased, a big amount of ambient light will pass to the CCD, causing a detecting error. Because of the aforesaid reasons, the bar-code reader must be closely attached to the bar code or disposed in front of the bar code within a very short distance during scanning. Because of regular bar-code optical scanners must be closely attached to the commercial articles so that the image of the bar code can be accurately picked up, the cashiers in for example supermarkets have to expend a lot of time in reading the bar codes of the purchased commercial articles.

SUMMARY OF THE INVENTION

The present invention has been accomplished to provide a bar-code optical scanner which permits the user to pick up the image of the bar code at a relatively longer distance without affecting the scanning result. According to the present invention, a converging prism is disposed in front of the light source to concentrate emitted light into a light beam, permitting it to be projected onto the bar code; the lens which is disposed between the reflector and the photosensor is made having a rectangular through hole forming a diaphragm, the long side of the through hole being disposed in parallel to the transversely disposed charge coupled device of the photosensor, the diameter of the through hole gradually reducing from the side of the photosensor toward the side of the reflector to match with the light path of reflected light passing therethrough; a converging meniscus lens is disposed in front of the photosensor to concentrate reflected light from the lens into the charge coupled device of the photosensor.

DETAILED DESCRIPTION OF THE PREFERRED EMBODIMENT

Figure 1:
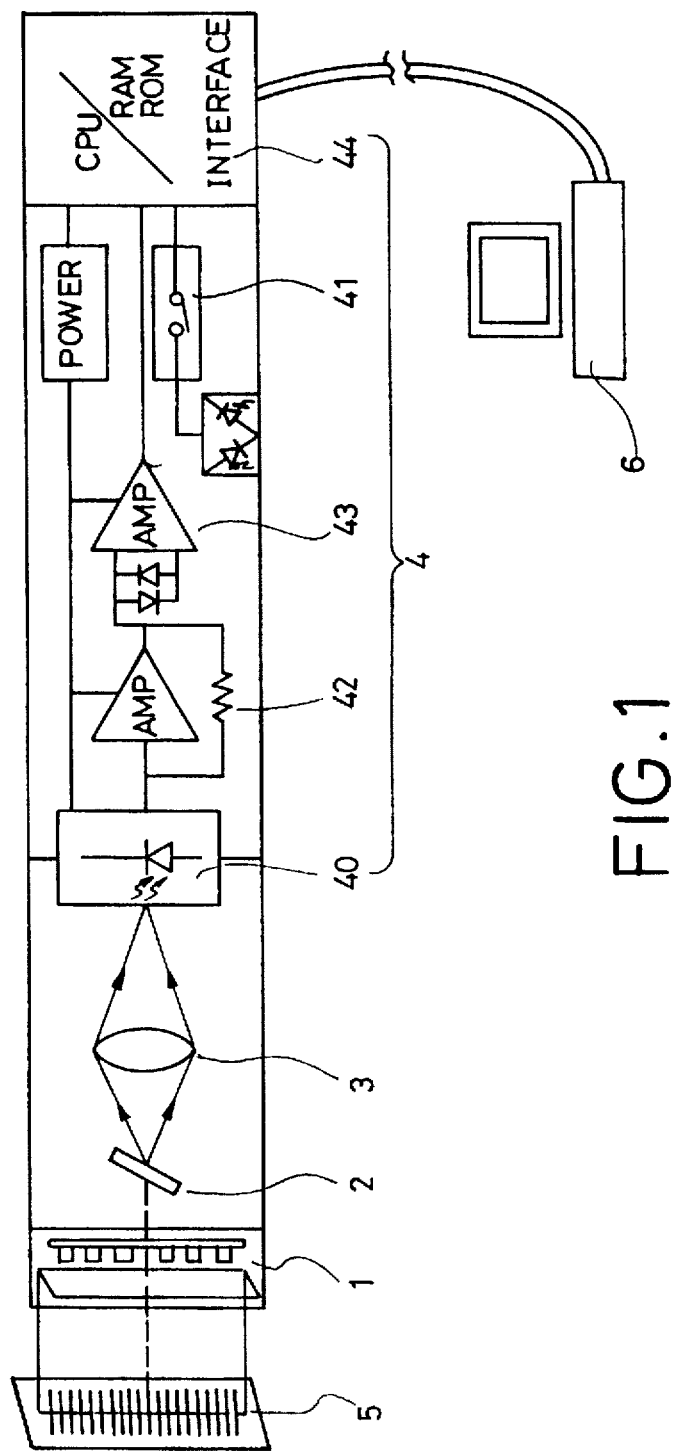
FIG. 1 is a circuit block diagram of a bar-code optical scanner and reader system according to the present invention.

Referring to FIG. 1, a bar-code optical scanner in accordance with the present invention is comprised of a light source 1, a reflector 2, a lens assembly 3, and a photosensor 4. The light of the light source 1 is projected onto the bar code 5, then reflected by the bar code 5 onto the photosensor 4 through the reflector 2 and the lens assembly 3. The photosensor 4 is comprised of a CCD (charge coupled device) 40, an infrared inductor control circuit 41, a CCD driver and amplifier circuit 42, a waveform sampler and comparator circuit 43, and a decoder 44. When the infrared inductor is induced, reflected light which passes from the bar code 5 through the lens assembly 3 is converted into a corresponding electronic signal by the CCD 40, and the electronic signal thus obtained is then sent through the CCD driver and amplifier circuit 42, the waveform sampler and comparator circuit 43, and the decoder 44 and processed by them into an encoded data. The encoded data is then sent to a computer or POS system 6, and processed by it into recognizable character data.

Figure 2:
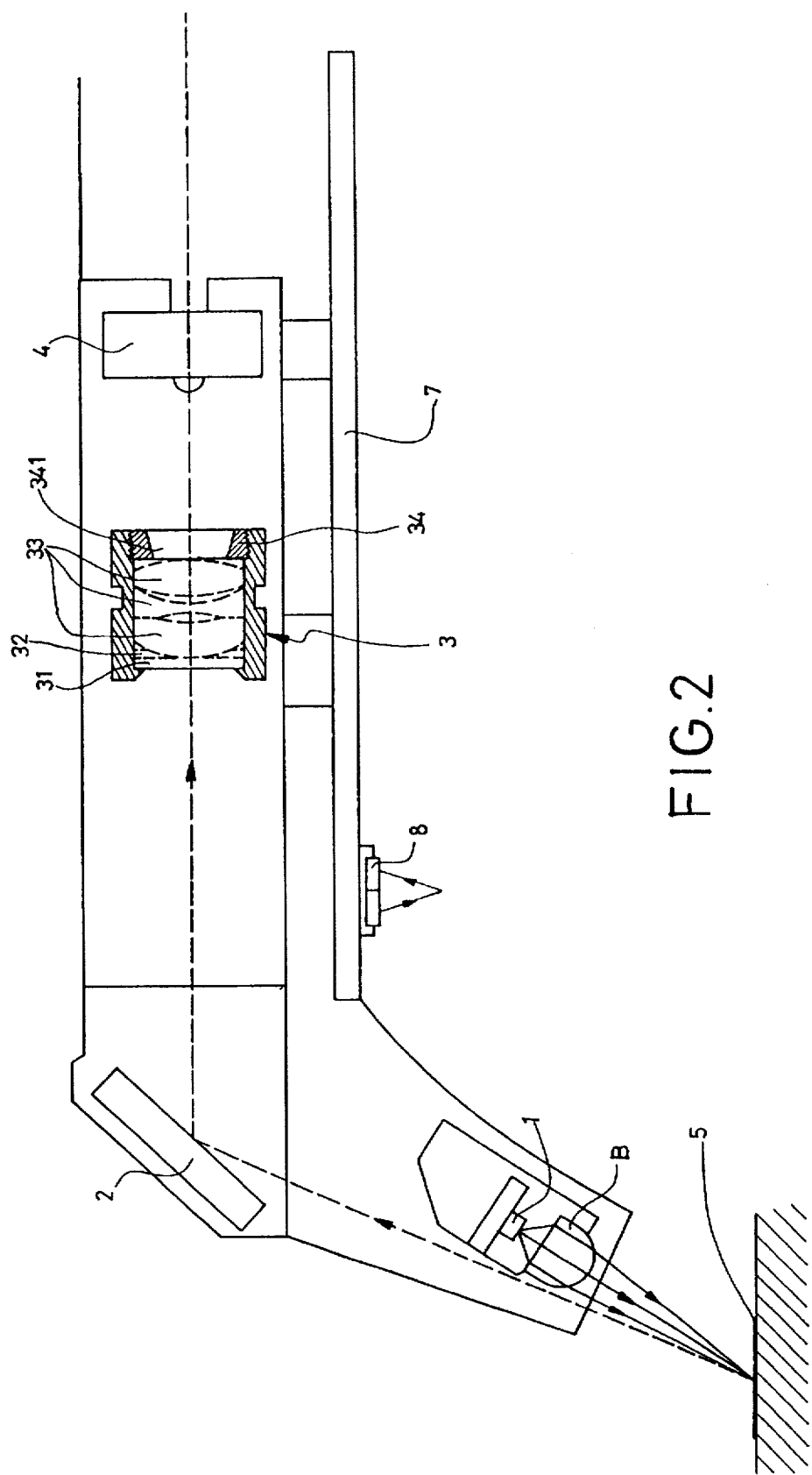
FIG. 2 is a light path sectional view of a bar-code optical scanner according to the present invention.

Referring to FIG. 2, one feature of the present invention is to concentrate light beam so as to reinforce the brightness of emitted light. The light source 1 is comprised of a plurality of (at least six) light emitting diodes arranged in a line. A converging prism B is disposed in front of the light source 1. The converging prism B has a cross section of half-round shape, having one side curving outwards, and an opposite side in a plane. Light from the light source passes through the converging prism B is approximately at the same elevation of the photosensor 40, and is then concentrated onto the bar code 5 by the converging prism B.

Figure 3:
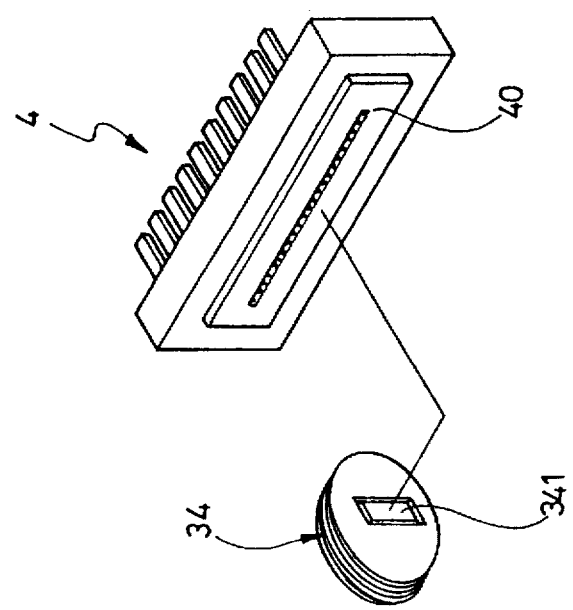
FIG. 3 is an elevational view of a photo sensor and a lock ring according to the present invention.

A second feature of the present invention is the design of the lens assembly 3. Referring to FIG. 3 and FIG. 2 again, the lens assembly 3 is comprised of a filter lens 31, a packing ring 32, a plurality of lenses 33, and a lock ring 34 respectively arranged into a line. The filter lens 31 permits light of a particular waveform to pass. The lenses 33 are retained between the packing ring 32 and the lock ring 34, having a respective particular curvature continuously arranged together for permitting light to smoothly pass from the filter lens 31 to the photosensor 40. The lock ring 34 has a rectangular center through hole 341 (i.e., the diaphragm) adapted for stopping diffused light. The diameter of the rectangular center through hole 341 gradually reduces from the back side toward the front side. The optically recognizable distance of the lens assembly 3 (namely, the depth of field) is relatively increased when the diaphragm (namely, the rectangular center through hole 341) is reduced. However, when the diameter of the diaphragm is reduced, less amount of incident light is allowed to pass to the photosensor 4. When insufficient light is imaged onto the photosensor 4, the photosensor 4 will be unable to positively pick up the image. In order to eliminate this problem, the area of the cross section of the through hole 341 is remained unchanged and the shape of the cross section of the through hole 341 is changed (from circular shape) to rectangle. Because the through hole 341 is made of rectangular shape, the transverse width is reduced while the longitudinal depth is relative increased. This design greatly increases the flux of light. Because the detecting area of the photosensor 4 is presented like a line and arranged in the transverse direction, only the transverse width of the through hole 341 (diaphragm) affects the depth of field. Therefore, the amount of incident light and the depth of field are simultaneously increased when the transverse width is reduced and the longitudinal width is increased. Further, because the light paths at two opposite sides of the through hole 341 are substantially presented in the form of two reversed cones and the lens assembly 3 has a certain thickness, the diameter of the through hole 341 of the lens assembly 3 must be made gradually reducing from the back side toward the front side so as to match with the light paths. When the distance of the bar code 5 is increased, the width of field is relatively increased. Therefore, the maximum bar code 5 reading length can be greatly increased by changing the through hole 341 of the lock ring 34 from conventional circular design to a rectangular shape without changing the structure of other parts of the lens assembly 3. As the number of commercial items is continuously increased, the bar code length will be relatively increased in the future. However, by means of the application of the present invention, conventional bar-code optical scanners can be simply re-arranged to meet the requirement.

A third feature of the present invention is the arrangement of a converging meniscus lens at the front side of the photosensor 4. The converging meniscus lens receives light beam from different incident angles, and concentrates it onto a spot, so that light beam which passes through the lens assembly 3 can be positively picked up by the photosensor 4.

The aforesaid three features of the present invention greatly increase the bar code scanning effect of the bar-code optical scanner. When the bar-code optical scanner of the present invention is operated, emitted light from the light source is concentrated onto the bar code 5 (the first feature), then constrained by the lens assembly 3 to be positively reflected onto the photosensor 4 (the second feature), and then reflected light is condensed by the converging meniscus lens into the photosensor 4 (the third feature). Therefore, the design of the converging prism 6 and the converging meniscus lens at the front side of the photosensor compasses the weakening of light due to the increasing of the distance of the bar code 5.

Furthermore, the bar-code optical scanner is equipped with an automatic infrared induction device. As illustrated in FIG. 2, this automatic infrared induction device is comprised of a control circuit 7, and an infrared sensor 8. When the infrared sensor 8 detects the presence of the hand, it immediately gives a signal to the control circuit 7, causing the control circuit 7 to turn on the light source 1. When the reading of a bar code succeeded, the control circuit 7 immediately turns off the light source 1. Because the bar-code optical scanner is automatically controlled by the infrared sensor 8, the bar code scanning operation can be conveniently achieved without through any control keys.

It is to be understood that the drawings are designed for purposes of illustration only, and are not intended as a definition of the limits and scope of the invention disclosed.

What the invention claimed is:

1. A bar-code optical scanner of the type comprising a light source controlled to project light onto a bar code of an article, a reflector adapted for reflecting reflected light from said bar code to a lens unit, a lens unit, and a photosensor having a transversely disposed charge coupled device and adapted for picking up the image of reflected light from said reflector through said lens unit, permitting picked up image to be processed into an electronic signal, wherein:

a converging prism is disposed in front of said light source to condense emitted light from said light source into a light beam, permitting it to be projected onto said bar code, said converging prism having a half-round cross section;

said lens unit comprises a rectangular through hole forming a diaphragm having a long side and a short side, the long side of said through hole being disposed perpendicular to the transversely disposed charge coupled device of said photosensor, said through hole having a diameter gradually reducing from the side of said photosensor toward the side of said reflector to match with the light path of reflected light passing therethrough;

a converging meniscus lens is disposed in front of said photosensor to concentrate reflected light passing from said lens unit into the charge coupled device of said photosensor.

* * * * *